US011150147B2

(12) United States Patent
Horter et al.

(10) Patent No.: US 11,150,147 B2
(45) Date of Patent: Oct. 19, 2021

(54) WOVEN FABRIC HAVING A PLURALITY OF WOVEN FABRIC LAYERS

(71) Applicant: PILZ GMBH & CO. KG, Ostfildern (DE)

(72) Inventors: Hansjürgen Horter, Oberboihingen (DE); Karl Gönner, Riedlingen (DE); Paul Hofmann, Illertissen (DE); Metin Caliskan, Reutlingen (DE); Onedin Ibrocevic, Ostfildern (DE); Matthias Kuczera, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 2 days.

(21) Appl. No.: 16/135,144

(22) Filed: Sep. 19, 2018

(65) Prior Publication Data

US 2019/0017885 A1 Jan. 17, 2019

Related U.S. Application Data

(63) Continuation of application No. PCT/EP2017/057849, filed on Apr. 3, 2017.

(30) Foreign Application Priority Data

Apr. 4, 2016 (DE) .......................... 102016106074.7

(51) Int. Cl.
*G01L 1/14* (2006.01)
*G01L 1/20* (2006.01)
(Continued)

(52) U.S. Cl.
CPC ................ *G01L 1/146* (2013.01); *D03D 1/00* (2013.01); *D03D 1/0088* (2013.01); *D03D 11/00* (2013.01);
(Continued)

(58) Field of Classification Search
CPC . G01L 1/146; G01L 1/18; G01L 1/205; G01L 5/228; D03D 1/00; D03D 1/0088;
(Continued)

(56) References Cited

U.S. PATENT DOCUMENTS 4,659,873 A * 4/1987 Gibson .................. H01H 3/141
178/18.05
4,715,235 A * 12/1987 Fukui ....................... D04B 1/14
73/862.68

(Continued)

FOREIGN PATENT DOCUMENTS

CN 101201278 A 6/2008
DE 60102003 T2 11/2004
(Continued)

OTHER PUBLICATIONS

German language International Search Report for PCT/EP2017/057849; dated Jun. 21, 2017; 13 pp.
(Continued)

*Primary Examiner* — Ryan D Walsh
(74) *Attorney, Agent, or Firm* — Harness, Dickey & Pierce, PLC

(57) ABSTRACT

A woven fabric includes first and second woven fabric layers with an intermediate layer in between, which form a sensor with an electrical characteristic that changes while a force is acting on the woven fabric. The first layer includes electrically conductive strips and electrically non-conductive strips arranged adjacent to one another in an alternating manner. The second layer includes alternating conductive strips and non-conductive strips that extend transverse to the strips of the first layer. At least some of the threads in each of the conductive strips of the first layer are conductive weft threads. At least some of the threads in each of the conductive strips of the second layer are conductive weft threads.

(Continued)

The non-conductive strips of the first and second layers are weft threads.

20 Claims, 8 Drawing Sheets

(51) Int. Cl.
| | | |
|---|---|---|
| *D03D 11/00* | (2006.01) | |
| *D03D 15/00* | (2021.01) | |
| *D03D 1/00* | (2006.01) | |
| *G01L 5/22* | (2006.01) | |
| *G01L 1/18* | (2006.01) | |

(52) U.S. Cl.
CPC .............. *D03D 15/00* (2013.01); *G01L 1/18* (2013.01); *G01L 1/205* (2013.01); *G01L 5/228* (2013.01); *B32B 2250/03* (2013.01); *D10B 2401/06* (2013.01); *D10B 2401/16* (2013.01)

(58) Field of Classification Search
CPC ............... D03D 11/00; D03D 15/00; D03D 2700/0166; D10B 2401/06; B32B 2250/03
See application file for complete search history.

(56) References Cited

U.S. PATENT DOCUMENTS

| | | | | |
|---|---|---|---|---|
| 4,795,998 | A | | 1/1989 | Dunbar et al. |
| 4,837,548 | A | * | 6/1989 | Lodini .................. H01C 10/12 338/47 |
| 4,878,148 | A | * | 10/1989 | Hee ......................... A61N 1/14 361/220 |
| 6,271,621 | B1 | * | 8/2001 | Ito .............................. G01L 1/16 310/358 |
| 6,333,736 | B1 | * | 12/2001 | Sandbach ............. G06F 3/0414 178/18.03 |
| 6,452,479 | B1 | * | 9/2002 | Sandbach ............... G06F 3/045 338/101 |
| 6,861,961 | B2 | * | 3/2005 | Sandbach ............... G06F 3/023 178/18.05 |
| 7,145,432 | B2 | * | 12/2006 | Lussey ................... H01H 3/141 338/47 |
| 7,365,031 | B2 | | 4/2008 | Swallow et al. |
| 8,161,826 | B1 | * | 4/2012 | Taylor ..................... G01L 1/18 73/862.044 |
| 10,228,806 | B2 | * | 3/2019 | Tomita .................... G01L 1/205 |
| 10,519,575 | B2 | * | 12/2019 | Thompson ............. D03D 13/00 |
| 10,591,273 | B2 | * | 3/2020 | Veca ....................... B60N 2/797 |
| 10,638,618 | B1 | * | 4/2020 | Teil ...................... G09G 3/3433 |
| 2002/0134116 | A1 | * | 9/2002 | Sandbach ............. H01H 13/785 66/202 |
| 2003/0010393 | A1 | * | 1/2003 | Kuji ...................... D21F 1/0045 139/383 A |
| 2003/0186608 | A1 | * | 10/2003 | Goldberg ................. A61N 1/14 442/304 |
| 2003/0211797 | A1 | | 11/2003 | Hill et al. |
| 2004/0113637 | A1 | * | 6/2004 | Thinnes ................. G01R 31/54 324/713 |
| 2005/0069695 | A1 | * | 3/2005 | Jung ...................... D03D 15/02 428/328 |
| 2005/0146076 | A1 | * | 7/2005 | Alexander ........... D03D 1/0088 264/257 |
| 2006/0228970 | A1 | * | 10/2006 | Orr .......................... D04H 3/05 442/329 |
| 2006/0258247 | A1 | * | 11/2006 | Tao ........................ D03D 15/00 442/301 |
| 2007/0141939 | A1 | * | 6/2007 | Sandbach .............. H01H 3/141 442/304 |
| 2008/0091097 | A1 | * | 4/2008 | Linti .................. A61B 5/04085 600/389 |
| 2010/0013406 | A1 | * | 1/2010 | Bhattacharya ......... H05K 1/189 315/291 |
| 2010/0154918 | A1 | * | 6/2010 | Li ............................ D04B 1/14 139/412 |
| 2010/0208445 | A1 | * | 8/2010 | Asvadi ................... H05K 1/189 361/809 |
| 2013/0053754 | A1 | * | 2/2013 | Heppe ................. A61M 1/3659 604/6.16 |
| 2013/0075018 | A1 | * | 3/2013 | Heppe ................. A61M 1/3659 156/148 |
| 2014/0150573 | A1 | | 6/2014 | Cannard et al. |
| 2015/0000425 | A1 | * | 1/2015 | Miura ....................... G01L 1/22 73/862.627 |
| 2015/0331522 | A1 | * | 11/2015 | McMillen ............ A61B 5/6843 345/174 |
| 2015/0331523 | A1 | * | 11/2015 | McMillen ............. G06F 3/0416 345/174 |
| 2016/0018274 | A1 | * | 1/2016 | Seitz .................... A61B 5/6843 73/862.626 |
| 2017/0146368 | A1 | * | 5/2017 | Kuczera .................... F16P 3/12 |
| 2017/0146413 | A1 | * | 5/2017 | Ibrocevic ............... G01L 1/205 |
| 2017/0148583 | A1 | * | 5/2017 | Hampe .................. H01H 3/141 |
| 2017/0249033 | A1 | * | 8/2017 | Podhajny ................ D03D 7/00 |
| 2017/0303392 | A1 | * | 10/2017 | Naigertsik .............. H05K 7/207 |
| 2018/0108826 | A1 | * | 4/2018 | Tajitsu ................... H01L 41/082 |
| 2018/0151795 | A1 | * | 5/2018 | Cobanoglu ........... H01L 41/087 |
| 2018/0171514 | A1 | * | 6/2018 | Cobanoglu ............ G01K 7/003 |
| 2018/0202874 | A1 | * | 7/2018 | Ibrocevic .............. G01L 1/2287 |
| 2018/0202875 | A1 | * | 7/2018 | Ibrocevic ................. G01L 1/26 |
| 2018/0319016 | A1 | * | 11/2018 | Ibrocevic .............. G01L 1/2268 |
| 2018/0327939 | A1 | * | 11/2018 | Cobanoglu ........ D03D 15/0027 |
| 2019/0017885 | A1 | * | 1/2019 | Horter ..................... G01L 1/146 |
| 2019/0021407 | A1 | * | 1/2019 | Howland ............... G06F 1/1637 |
| 2019/0024269 | A1 | * | 1/2019 | Horter ..................... G01L 1/146 |
| 2020/0040492 | A1 | * | 2/2020 | Pilz ......................... G01V 3/088 |

FOREIGN PATENT DOCUMENTS

| | | |
|---|---|---|
| DE | 102011111061 A1 | 2/2013 |
| JP | 2010203809 A | 9/2010 |
| JP | 2011102457 A | 5/2011 |
| JP | 201231550 A | 2/2012 |
| JP | 201631269 A | 3/2016 |
| WO | WO-2005121729 A1 | 12/2005 |

OTHER PUBLICATIONS

Office Action for CN Patent Application No. 201780021742.4; dated Oct. 10, 2020; 11 pages.

* cited by examiner

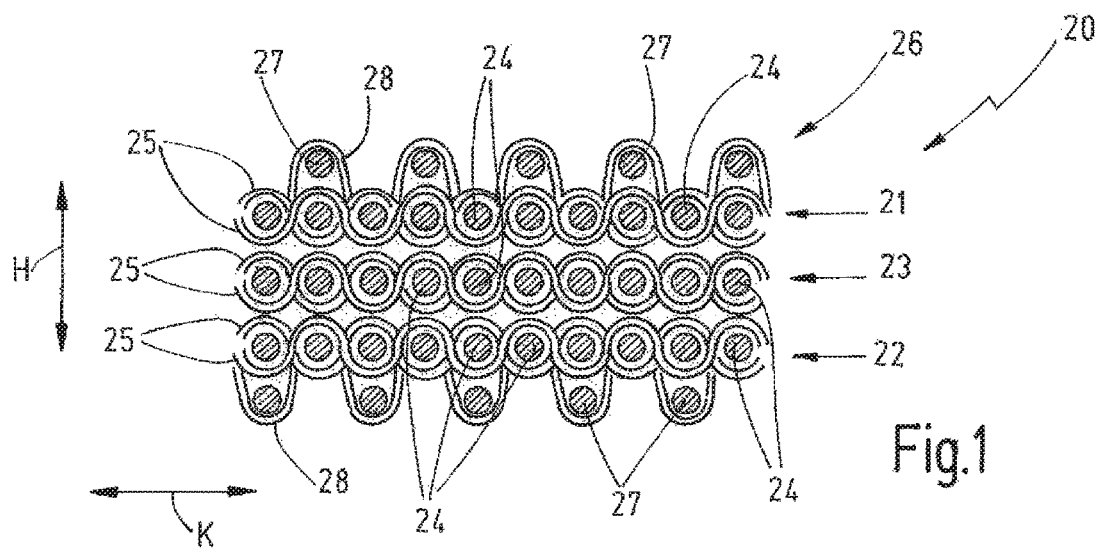
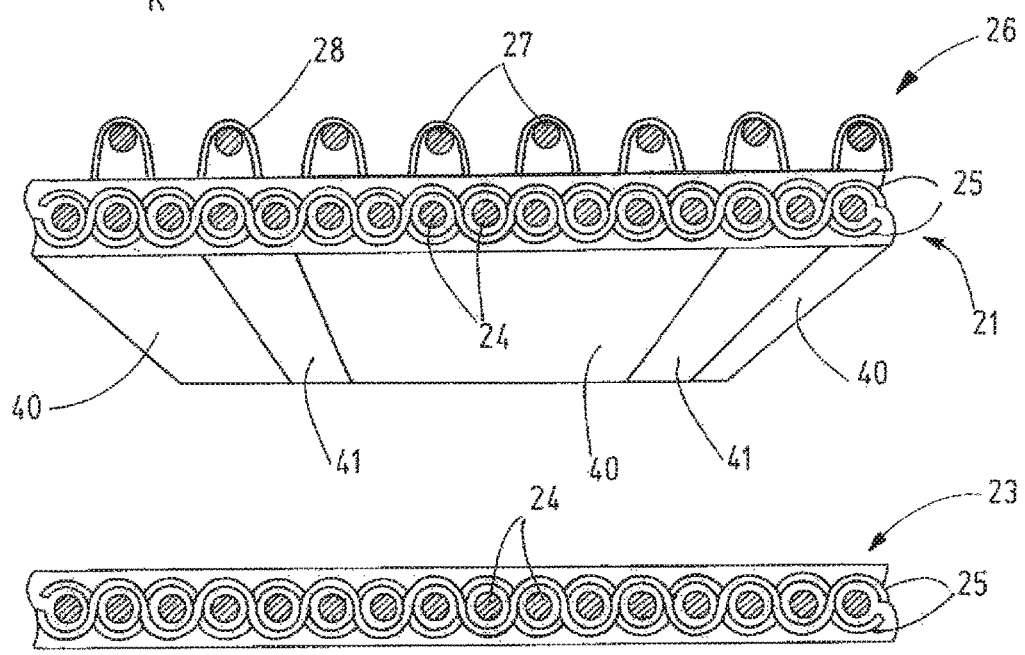
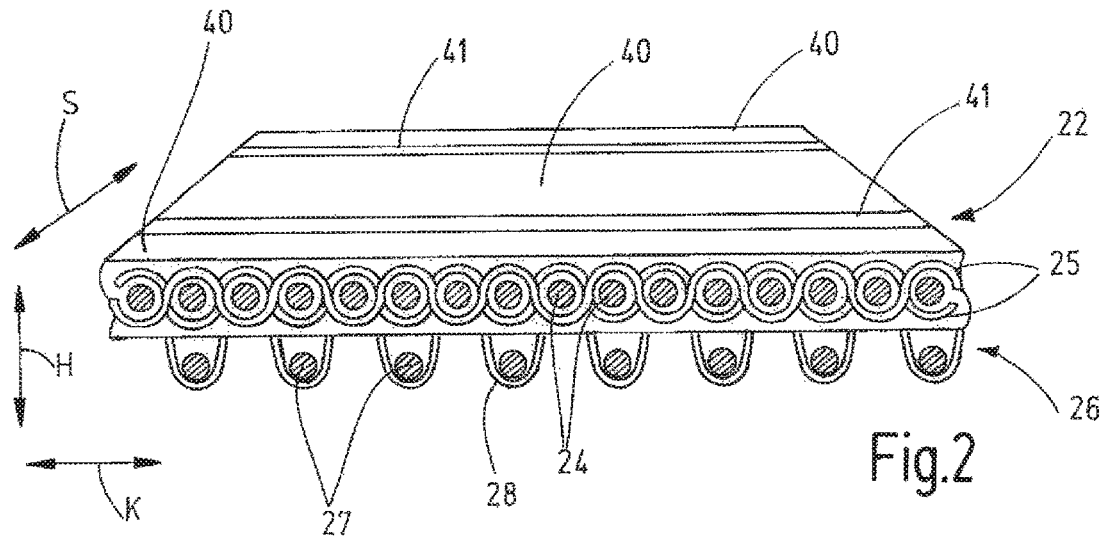
Fig.1
Fig.2

WOVEN FABRIC HAVING A PLURALITY OF WOVEN FABRIC LAYERS

CROSS-REFERENCES TO RELATED APPLICATIONS

This application is a continuation of international patent application PCT/EP2017/057849, filed on Apr. 3, 2017, designating the U.S., which international patent application has been published in German language and claims priority from German patent application DE 10 2016 106 074.7, filed on Apr. 4, 2016. The entire contents of these priority applications are incorporated herein by reference.

BACKGROUND OF THE INVENTION

The invention relates to a woven fabric having at least three layers that are arranged one above the other and at least two of said layers are woven fabric layers. The woven fabric is configured for the purpose of ascertaining a force or a pressure that is acting upon the woven fabric layers.

A sensory woven fabric having a woven fabric layer is disclosed by way of example in U.S. Pat. No. 4,795,998 A. Conductive threads of the woven fabric layer cross at crossing sites. The transition resistance between the threads that lie against one another changes in dependence upon a force that is acting upon the woven fabric layer. As a consequence, a force that is acting upon one of the crossing sites may be identified.

WO 2005/121729 A1 discloses a textile capacitive sensor having as the lowest layer a textile that is conductive over its entire surface and a non-electrically conductive uppermost layer. Planar electrodes are applied to this upper layer, said electrodes together with the lowest layer respectively forming a capacitor with variable capacitance. A non-electrically conductive elastic material is arranged between the uppermost layer and the lowest layer. If the spacing between the electrodes and the lowest conductive layer is changed by means of a force acting upon the textile, the capacitance changes, which may be ascertained by means of a corresponding circuit.

DE 60102003 T2 discloses a conductive pressure-sensitive material. In this case, conductive threads are arranged crossing in a layer, wherein without a force acting upon the threads an electrically conductive contact is not produced at the crossing points. Electrically non-conductive threads are incorporated for this purpose, said threads maintaining the spacing between the crossing electrically conductive threads in the starting state. An electrically conductive contact is only produced at a crossing site if a force or a pressure acts upon the material.

A similar arrangement is also known from in U.S. Pat. No. 4,659,873 A. There, electrically conductive woven fabric layers are spaced apart from one another by means of a non-conductive spacing means such as an air gap, non-conductive threads or dome-shaped spacers. When a force acts upon said threads, an electrically conductive contact is produced between the woven fabric layers.

SUMMARY OF THE INVENTION

The object of the present invention can be considered to be that of providing a sensory woven fabric that may be connected in a particularly simple manner to an external evaluating circuit.

According to an aspect of the present invention this object is achieved by means of a woven fabric having the features according to claim 1.

The woven fabric has at least three layers that are arranged one above the other, wherein at least two of said layers are woven fabric layers. One of the layers forms a first woven fabric layer and a further layer forms a second woven fabric layer. The first and the second woven fabric layer comprise respectively electrically conductive warp threads and/or weft threads. Another further intermediate layer is provided between the first woven fabric layer and the second woven fabric layer and said intermediate layer may be formed by means of an intermediate woven fabric layer. The intermediate layer may also comprise or be embodied from non-woven material and/or foam material and/or a film and/or a knitted fabric and/or a worked fabric and/or a mat.

The first woven fabric layer, the second woven fabric layer and the intermediate layer are arranged according to a type of a sandwich structure. The layers form a sensor arrangement that comprises an electrical characteristic that changes while a force is acting upon the woven fabric layers. In this case, the intermediate layer preferably lies directly against the first and the second woven fabric layer.

The sensor arrangement may be a capacitive sensor arrangement and/or a piezoelectric sensor arrangement and/or a resistive or a piezoresistive sensor arrangement. If the intermediate woven fabric layer is embodied by way of example from an electrically non-conductive material by way of example electrically non-conductive threads that forms or form a dielectric, a capacitive sensor arrangement according to a type of plate capacitor is achieved. The intermediate layer or woven fabric layer may also comprise material or threads that include piezoelectric material with the result that a piezoelectric sensor arrangement is formed. Moreover, there is the possibility that the intermediate woven fabric layer also comprises material or threads of electrically conductive material whose electrical resistance changes in the case of a force or pressure acting upon said threads with the result that a resistive or piezoresistive sensor arrangement is formed.

It is advantageous if only three woven fabric layers are provided. If these are directly connected to one another using a weaving technique, the woven fabric may be embodied exclusively from a total of three layers. In the case of another exemplary embodiment a binding system may be provided in addition to the three layers, said binding system fastening the three layers or woven fabric layers to one another.

The three layers extend in a plane that is spanned by a warp direction and a weft direction. Apart from the undulation of the warp threads and weft threads by means of the binding produced using a weaving technique, the warp threads extend in the warp direction and the weft threads extend in the weft direction. The thickness of the woven fabric at a right angle with respect to the warp direction and at a right angle with respect to the weft direction in a height direction is less than the dimension of the woven fabric in the warp direction and also in the weft direction.

The first woven fabric layer and the second woven fabric layer have respectively electrically conductive and electrically non-conductive strips that are arranged adjacent to one another in an alternating manner. The strips extend in the warp direction or in the weft direction. The strips are oriented in the second woven fabric layer in a transverse manner and preferably at a right angle with respect to the orientation of the strips in the first woven fabric layer. The conductive strips form a grid or matrix structure. A sensor field so to speak is formed respectively on the crossing sites with the result that depending upon the thickness and the number of the crossing sites it is possible to determine the site or the location at which the force acts upon the woven fabric or the sensor arrangement.

In the case of this arrangement, it is possible to electrically contact the woven fabric at a maximum two adjacent woven edges or sides using an evaluating circuit. As a consequence, the use of the sensory woven fabric is simplified, in particular if a large surface is to be fitted with said woven fabric. The woven fabric in accordance with this disclosure may also be referred to as a sensory multi-layer woven fabric. It is configured for this purpose so as to localize the force or pressure that is acting upon the woven fabric at specific sites. The woven fabric is consequently capable of determining in a spatially resolved manner the site upon which the force or pressure is acting and optionally in addition is also capable of characterizing the amount of force or pressure that is acting upon the threads. Such woven fabrics may be used in many ways. The woven fabrics may be laid by way of example on a substrate in order to indicate the position of moving objects. As a consequence, it is by way of example possible to avoid collisions between moving objects or between moving objects and stationary obstacles. Another application possibility resides in fitting the outer surface of grippers, robotic arms or the like with a sensory woven fabric with the result that it is possible to determine a contact and the site at which the gripper or robotic arm makes contact with an object. Many other applications are also possible.

It is preferred that the width of a conductive strip transverse with respect to its extent in the warp direction or in the weft direction is smaller than the width of an adjacent non-conductive strip. This embodiment may be achieved in the first and/or in the second woven fabric layer. The proportion of the surface of the woven fabric that may be used in a sensory manner may be maximized by means of minimizing the width of the non-conductive strips.

It is advantageous if only two or three layers or woven fabric layers are provided. A resistive or piezoresistive sensor arrangement, a capacitive sensor arrangement or a piezoelectric sensor arrangement may be constructed using three layers. The physical function of the sensor arrangement depends upon the embodiment of the intermediate layer. If the intermediate layer comprises yarns and by way of example is embodied as a woven fabric layer, the physical function of the sensor arrangement depends upon the yarn material.

In the case of one preferred exemplary embodiment, an electrically conductive intermediate strip may be woven respectively in the first woven fabric layer or the second woven fabric layer in at least one electrically non-conductive strip, said intermediate strip being electrically insulated with respect to the two adjacent electrically conductive strips in this woven fabric layer. In particular, each electrically conductive intermediate strip may be connected in the first woven fabric layer or second woven fabric layer by means of a through-contacting arrangement to precisely one electrically conductive strip of the respective other woven fabric layer. As a consequence, it is possible to electrically connect the woven fabric to an external circuit via a single woven fabric layer and preferably to a single woven fabric edge. The connecting region on this woven fabric edge extends preferably only over one woven fabric edge region that may connect for example to a corner of the woven fabric. Means may be provided on this connecting region for plugging on a plug connection.

It is advantageous if the electrically conductive threads (warp threads or weft threads) that extend in an electrically conductive strip in the direction of the strip are electrically connected to one another by means of at least one transverse contacting arrangement. As a consequence, it is ensured that all the electrically conductive warp threads or weft threads of this strip are electrically connected directly to one another and an electrical voltage or an electrical current may be tapped at each of these electrically conductive warp threads or weft threads.

The transverse contacting arrangement may either be produced via a suitable binding arrangement in conjunction with a suitable warp thickness and weft thickness or by way of example by means of at least one electrically conductive weft thread or warp thread that extends in a transverse manner with respect to the direction of the strip.

The first woven fabric layer is preferably electrically connected on a single side of the woven fabric to an evaluating circuit. In the case of one exemplary embodiment, the strips extend away from this side. In a similar manner thereto, the second woven fabric layer may also be electrically connected on a single side of the woven fabric to an evaluating circuit. The strips of the second woven fabric layer may also extend away from said side.

It is in particular advantageous if the first woven fabric layer is electrically connected on a first side of the woven fabric and the second woven fabric layer is electrically connected on a second side of the woven fabric respectively to an evaluating circuit. The first side and the second side preferably adjoin one another and form a common corner of the woven fabric.

Alternatively thereto, it is also possible that the first and the second woven fabric layer are electrically connected on a single common side of the woven fabric to an evaluating circuit. Through-contacting arrangements for providing an electrical connection may be provided here in the electrically non-conductive strips of one of these two woven fabric layers. An electrical connection to an allocated conductive strip in the respective other woven fabric layer may be provided in the first woven fabric layer or the second woven fabric layer by means of these through-contacting arrangements. The through-contacting arrangements may be connected in an electrically conductive manner to the side of the woven fabric or the woven fabric layer at which the electrical contacting arrangement to the evaluating circuit may be provided. By way of example, for this purpose a conductive connection may be produced within the electrically non-conductive strip respectively to the through-contacting arrangement.

Moreover, it is advantageous if a warp thread or a weft thread of the first woven fabric layer from an electrically non-conductive strip forms a woven binding arrangement with a weft thread or warp thread of another woven fabric layer. Unintended electrical connections between the woven fabric layers do not occur by means of this woven binding arrangement. In a similar manner thereto, it is also possible that a warp thread or a weft thread of the second woven fabric layer embodied from an electrically non-conductive strip forms a woven binding arrangement with a weft thread or warp thread of another woven fabric layer.

In the case of one preferred exemplary embodiment, a binding system having electrically non-conductive binding warp threads and/or electrically non-conductive binding weft threads is provided. The binding system forms woven binding arrangements for connecting the woven fabric layers. It is preferred that the first woven fabric layer, the second woven fabric layer and the intermediate layer or woven fabric layer are not directly connected to one another using a weaving technique. The connection is provided directly via the binding system.

It is advantageous if during production of the first woven fabric layer, of the second woven fabric layer and—provided that the intermediate layer is embodied as a woven fabric layer—of the intermediate woven fabric layer, the woven binding arrangements are formed so as to connect the three woven fabric layers. The sensor arrangement or the sensory woven fabric is in particular produced on a weaving machine, wherein the woven fabric layers are already directly and/or indirectly connected to one another during the production process, in other words during the weaving procedure. Subsequent processing steps for connecting the woven fabric layers may therefore be omitted.

One of the woven fabric layers that are provided forms a lowest woven fabric layer and another of the woven fabric layers that are provided forms an uppermost woven fabric layer. The lowest woven fabric layer and/or the uppermost woven fabric layer may be formed respectively by means of binding weft threads and/or binding warp threads of the binding system. It is also possible that the first woven fabric layer forms the uppermost woven fabric layer and/or the second woven fabric layer forms the lowest woven fabric layer. Consequently, by way of example two to five woven fabric layers may be provided.

If a binding system is provided, it may be advantageous if the first and second woven fabric layer only lie against the intermediate layer and are not directly connected to one another using a weaving technique.

BRIEF DESCRIPTION OF THE DRAWINGS

Further advantageous embodiments of the invention are apparent from the dependent claims, the description and also the drawing. Preferred exemplary embodiments of the invention are explained in detail below with reference to the attached drawings. In the drawings:

FIG. 1 illustrates a heavily schematic sectional view of an exemplary embodiment of a woven fabric in a transverse manner with respect to the weft direction, FIG. 2 illustrates the woven fabric embodiment shown in FIG. 1 in a schematic exploded view.

DESCRIPTION OF PREFERRED EMBODIMENTS

Figure 3:
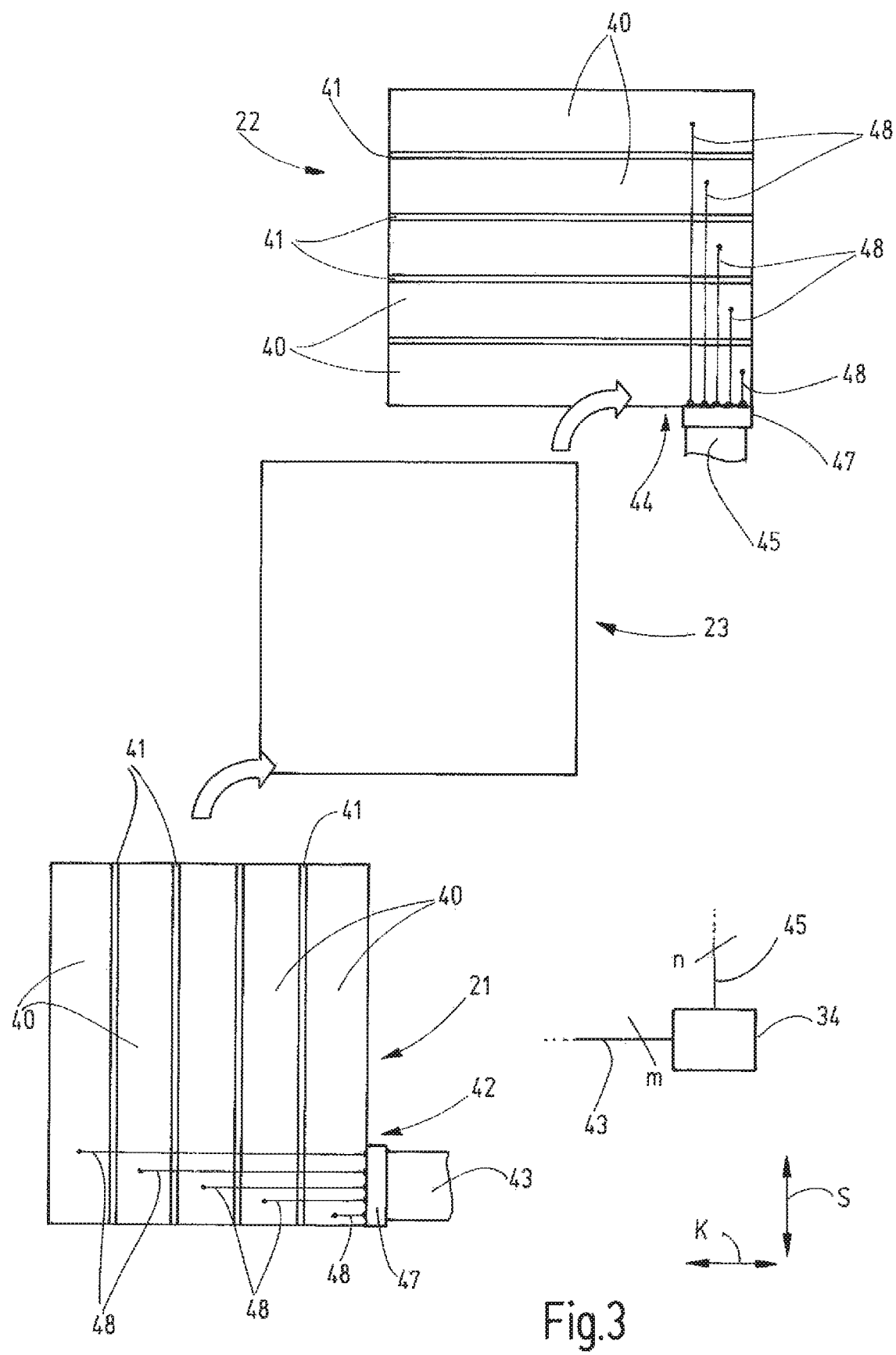
FIG. 3 illustrates in a block diagram-like manner an exploded view of the construction of the woven fabric in accordance with FIGS. 1 and 2.

FIGS. 1 to 8 illustrate schematically various illustrations and views of a multi-layer woven fabric 20. The woven fabric 20 has at least three and in the case of the exemplary embodiment precisely three layers that are formed by way of example by means of woven fabric layers 21, 22, 23. Each woven fabric layer 21, 22, 23 respectively comprises multiple weft threads 24 and also warp threads 25. Apart from the undulation that is produced by the woven binding arrangements within a woven fabric layer 21, 22, 23 the warp threads 25 extend in a warp direction K and the weft threads 24 extend in a weft direction S that is oriented at a right angle with respect to the warp direction K. The weft direction S and the warp direction K span a plane in which the woven fabric 20 extends. At a right angle with respect to this plane in the weft direction S and warp direction K the woven fabric 20 has a thickness in a height direction H. The dimension of the woven fabric 20 in the height direction H is smaller than the dimension in the weft direction S and the dimension in the warp direction K, preferably by at least the factor 10 to 100.

The weft threads 24 and the warp threads 25 of each woven fabric layer 21, 22, 23 are connected to one another within the relevant woven fabric layer 21, 22, 23 using a weaving technique. Optionally, the weft threads 24 and warp threads 25 of one of the woven fabric layers 21, 22, 23 may form woven binding arrangements directly with warp threads 25 or weft threads 24 of another of the woven fabric layers 21, 22, 23. In the case of the preferred exemplary embodiments that are illustrated in the drawings, the woven fabric layers 21, 22, 23 are not directly connected to one another using a weaving technique but rather a binding system 26 is provided that comprises binding weft threads 27 and binding warp threads 28. The woven fabric layers 21, 22, 23 are fastened to one another or against one another by way of example only via the binding system 26. The weft threads 24 and the warp threads 25 of each individual woven fabric layer 21, 22, 23 are in this case bound to one another using a weaving technique only within the respective woven fabric layer 21, 22, 23.

One of the woven fabric layers forms a first woven fabric layer 21 that comprises electrically conductive weft threads 24 and/or electrically conductive warp threads 25. A further woven fabric layer forms a second woven fabric layer 22 that like-wise comprises electrically conductive weft threads 24 and/or electrically conductive warp threads 25. An intermediate woven fabric layer 23 is arranged between the first woven fabric layer 21 and the second woven fabric layer 22. The intermediate woven fabric layer 23 lies with one side directly against the first woven fabric layer 21 and with the opposite side directly against the second woven fabric layer 22. The three woven fabric layers 21, 22, 23 are held against one another in accordance with the example—as previously mentioned—by means of the binding system 26.

Alternatively or in addition thereto, non-woven material and/or foam and/or film material and/or other textile materials such as a knitted fabric and/or a worked fabric and/or a mat may be used as an intermediate layer in lieu of the woven fabric material. It is advantageous if the material of the intermediate layer may be arranged between the first woven fabric layer and the second woven fabric layer in the form of yarns that are circular in cross section and/or band-shaped elements when producing said first woven fabric layer and second woven fabric layer, in particular by means of a weft insertion in a weaving machine.

The woven fabric 20 has an uppermost woven fabric layer LO and also a lowest woven fabric layer LU. Depending upon how the woven binding arrangement between the three woven fabric layers 21, 22, 23 is achieved and depending upon whether a binding system 26 is provided or not, the first woven fabric layer 21 may form the uppermost woven fabric layer LO and/or the second woven fabric layer 22 may form the lowest woven fabric layer LU.

Figure 10:
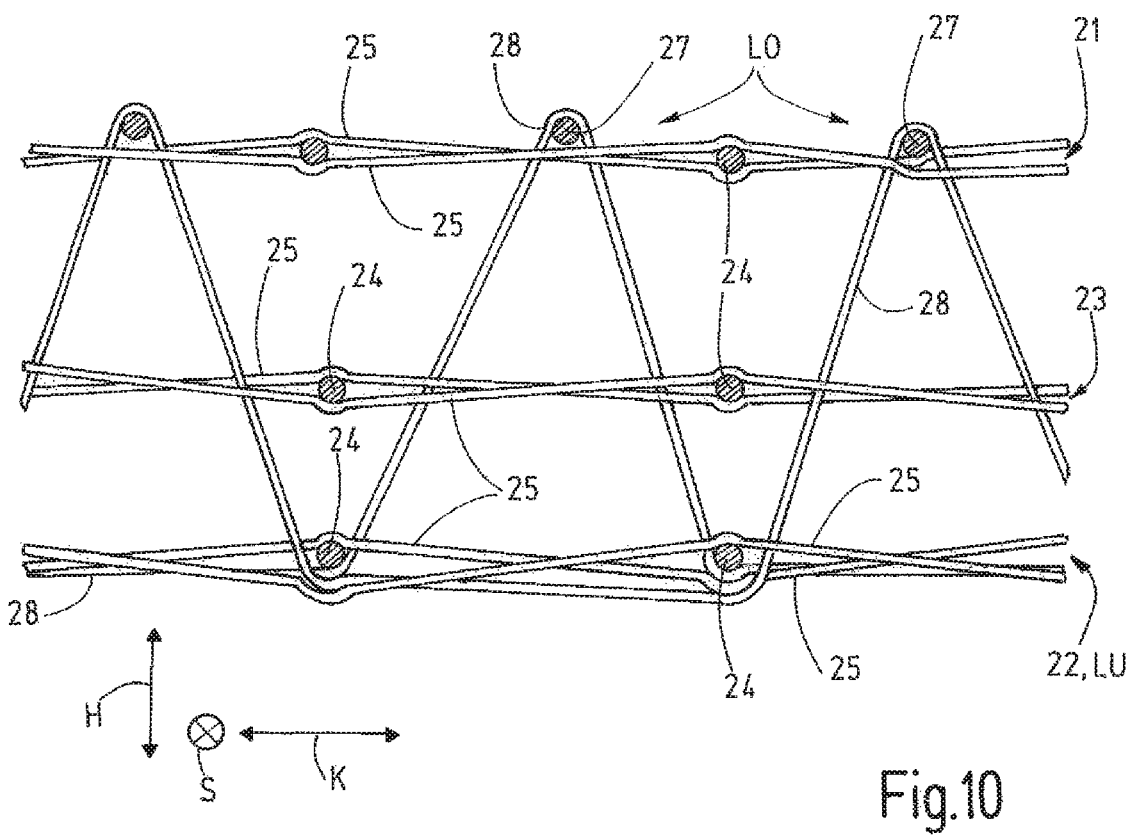

In the case of the exemplary embodiment that is illustrated in FIG. 10, the binding weft threads 27 of the binding system 26 are only arranged adjacent to the first woven fabric layer 21. The binding warp threads 28 form woven binding arrangements with the binding weft threads 27 and also the weft threads 24 of the second woven fabric layer 22.

In the case of specific exemplary embodiments, the binding system 26 could also be embodied without binding weft threads 27 and at least respectively a partial quantity of the weft threads 24 of the first woven fabric layer 21 and of the second woven fabric layer 22 are used so as to produce the woven binding arrangement sites. In the case of the exemplary embodiment that is illustrated in FIG. 10, the uppermost woven fabric layer LO is formed by means of the binding weft threads 27 and the binding warp threads 28 adjacent to the first woven fabric layer 21. The second woven fabric layer 22 together with the binding warp threads 28 forms the lowest woven fabric layer LU. In the case of the examples of the binding system 26 that are illustrated in FIGS. 11 and 12, the binding warp threads 28 could be omitted.

Figure 11:
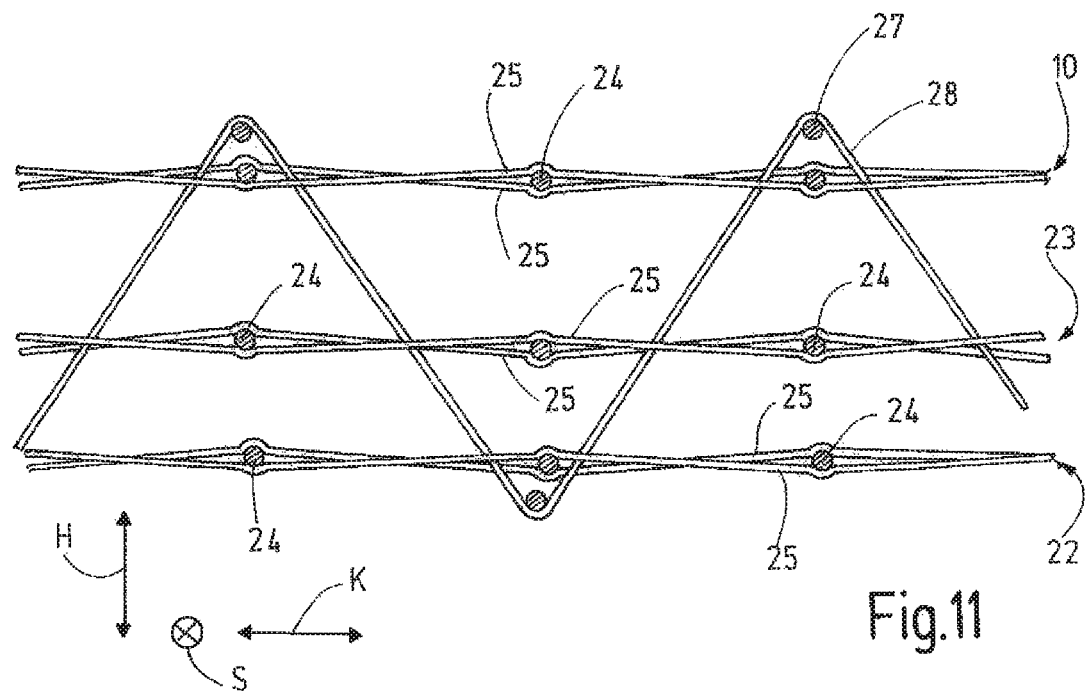
Figure 12:
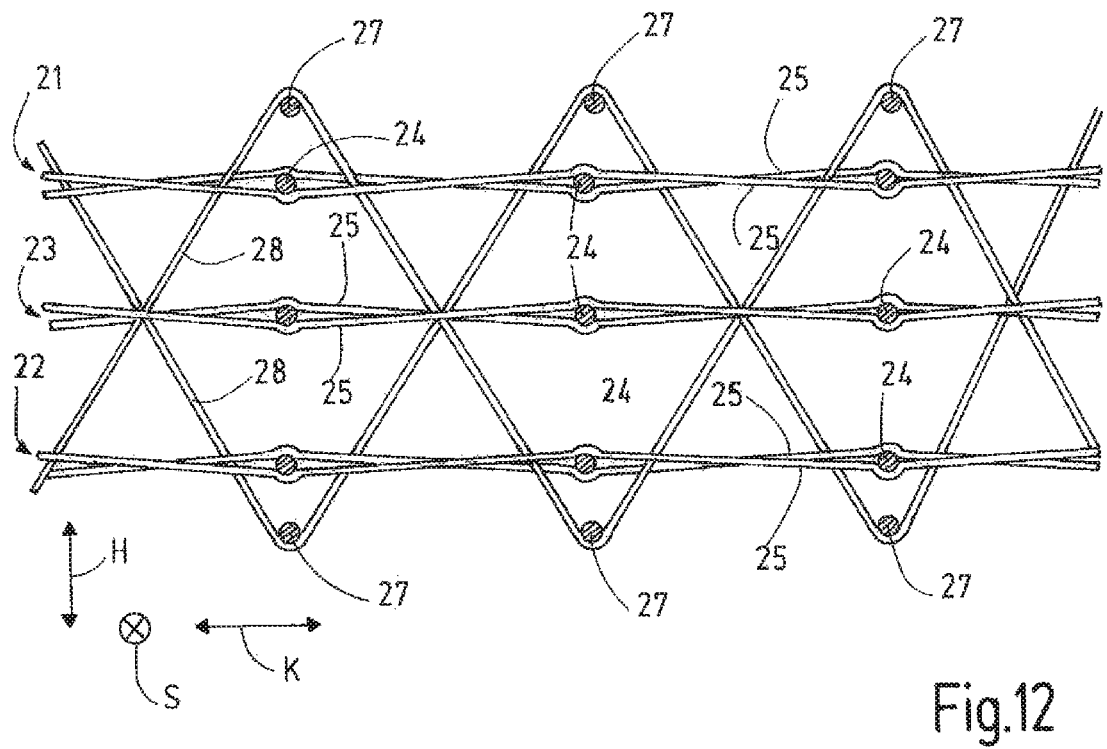
Figure 13:
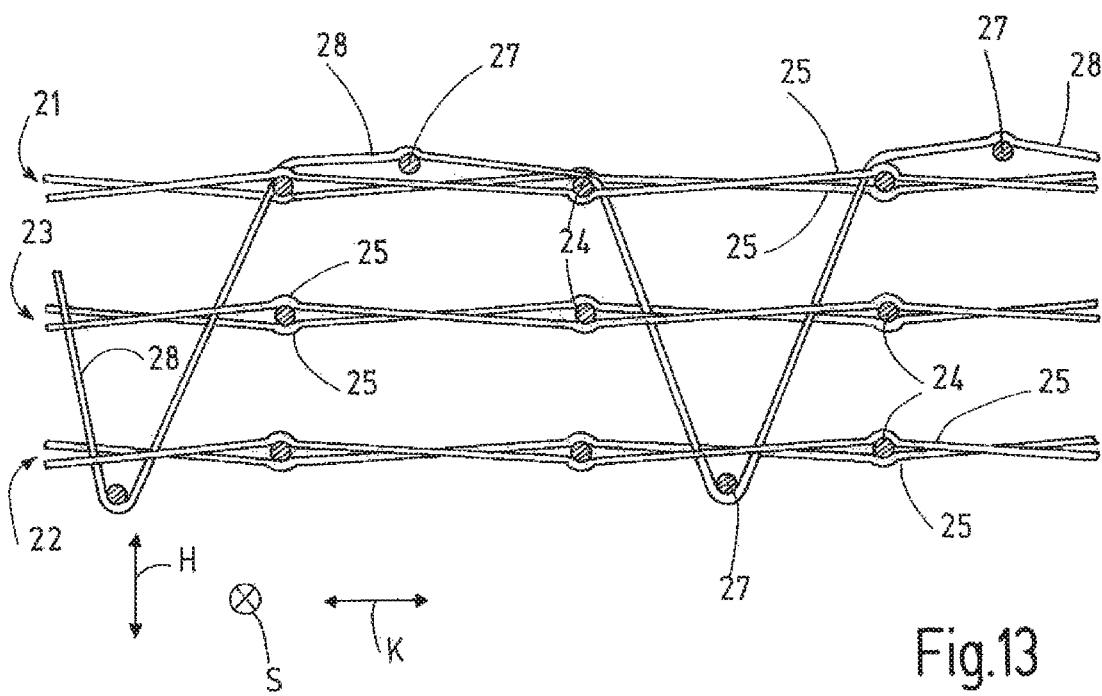

In the case of the further exemplary binding variants in accordance with the FIGS. 11 to 13 both the uppermost woven fabric layer LO as well as the lowest woven fabric layer LU are arranged respectively adjacent to the first woven fabric layer 21 or to the second woven fabric layer 22 and are formed by means of binding weft threads 27 and binding warp threads 28. The position of the binding weft threads 27 may be offset for this purpose in the warp direction K at approximately the height of the weft threads 24 of the woven fabric layers 21, 22, 23 (FIGS. 11 and 12) or in the warp direction K (FIG. 13). The number of the binding weft threads 27 may deviate from the number of the weft threads 24 of the woven fabric layers 21, 22, 23 per length section of the woven fabric in the warp direction K. For example, in the case of the embodiment in FIG. 12 double the number of binding weft threads 27 are used per length section as in the woven fabric layers 21, 22, 23.

The type of the woven binding arrangements within a woven fabric layer 21, 22, 23 and also the type of the woven binding arrangement by means of the binding system 26 may be selected in principle in an arbitrary manner. Satin weaves, plain weaves, twill weaves, leno weaves etc. may be used. The types of binding arrangements in the woven fabric layers 21, 22, 23 may be identical or—in a departure from the illustrated preferred exemplary embodiments—may also differ from one another.

Different yarns and/or different yarn thicknesses and/or varying numbers of yarns and/or different yarn cross sections may be used in the woven fabric layers 21, 22, 23 and also in the binding system 26. By way of example, band-shaped weft threads and/or band-shaped warp threads may be used in the intermediate layer or intermediate woven fabric layer 23.

As is evident in the above explanations, in accordance with the example at least three woven fabric layers 21, 22, 23 are provided and optionally additionally one or two woven fabric layers that are formed by means of the binding system 26 and that may form the uppermost woven fabric layer LO adjacent to the first woven fabric layer 21 and/or the lowest woven fabric layer LU adjacent to the second woven fabric layer 22.

Figure 6:
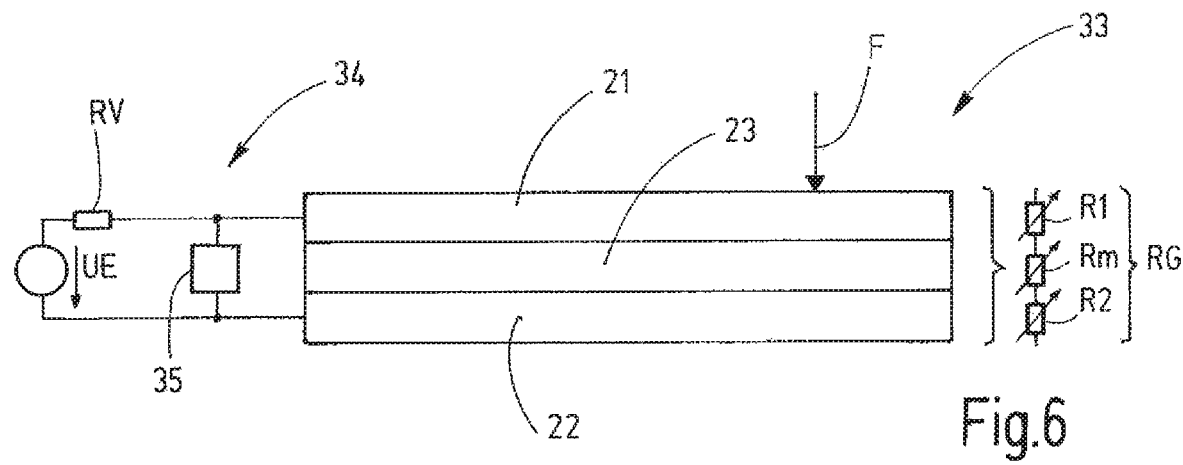
Figure 7:
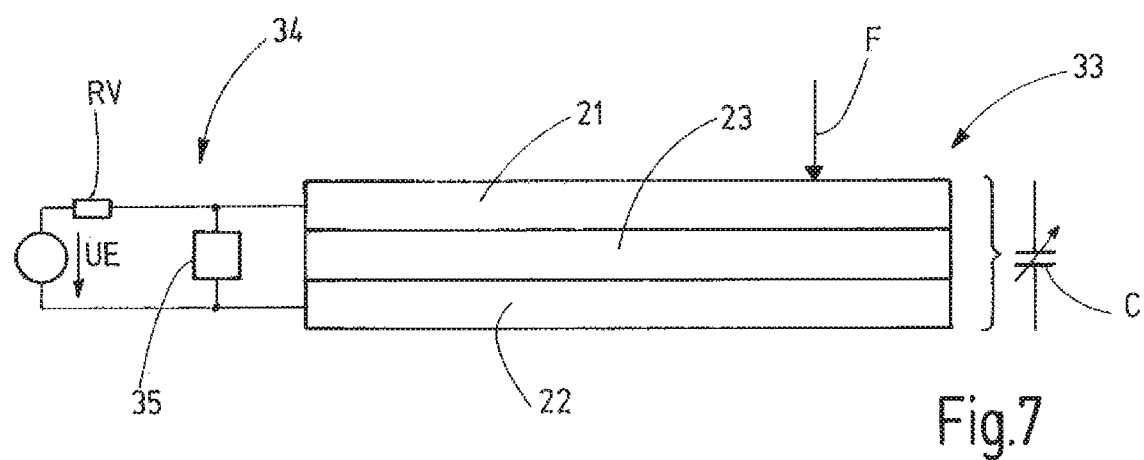
Figure 8:
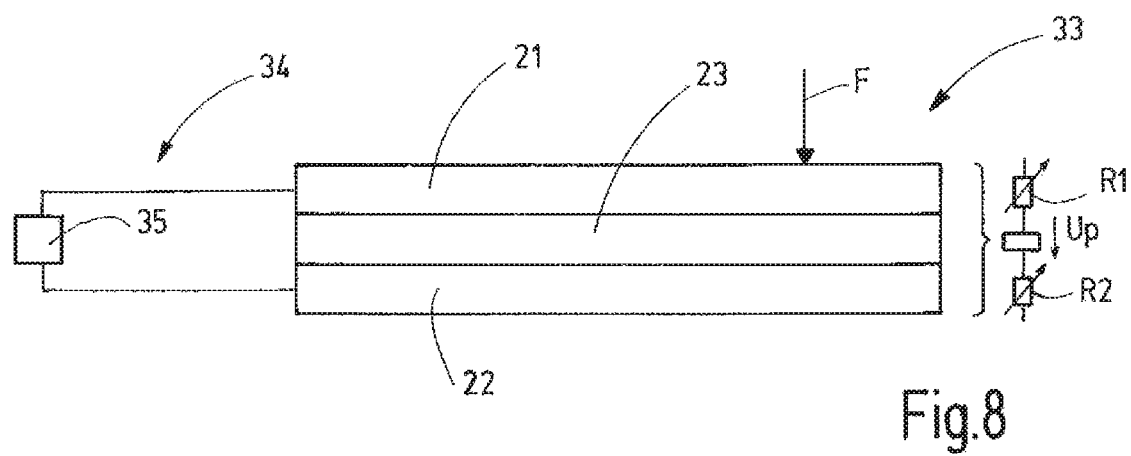

The woven fabric layers 21, 22, 23 together form a sensor arrangement 33 (FIGS. 6-8). The sensor arrangement 33 has at least one changing electrical characteristic. By way of example, the sensor arrangement 33 may comprise a total resistance RG that changes depending upon a force F that is acting upon the sensor arrangement 33, a changing capacitance C or a changing piezo voltage Up. The electrical characteristics of the sensor arrangement 33 depend upon the yarn characteristics, in particular in the intermediate woven fabric layer 23.

In the case of one exemplary embodiment (FIG. 6) the intermediate woven fabric layer 23 comprises electrically conductive weft threads 24 and/or warp threads 25 that comprise piezoresistive material with the result that the piezoresistive resistance Rm of the intermediate woven fabric layer 23 changes depending upon the force F that is acting upon the woven fabric layers. The piezoresistive resistance Rm is the through-going resistance of the intermediate woven fabric layer 23 when a current is flowing from the first woven fabric layer 21 through the intermediate woven fabric layer 23 into the second woven fabric layer 22 or conversely. Moreover, by means of a force F that is acting upon the woven fabric layers a first transition resistance R1 is formed between the first woven fabric layer 21 and the adjacent intermediate woven fabric layer 23 and also a second transition resistance R2 is formed between the second woven fabric layer 22 and the intermediate woven fabric layer 23, said transition resistance changing depending upon the force F that is acting upon the woven fabric layers. The three woven fabric layers therefore generate a series circuit from a first transition resistance R1, a piezoresistive resistance Rm and also a second transition resistance R2 that respectively change depending upon the force F that is acting upon the woven fabric layers. This series circuit has a total resistance RG that is provided from the sum of the first transition resistance R1, the piezoresistive resistance Rm and the second transition resistance R2.

The first woven fabric layer 21 and the second woven fabric layer 22 are connected to an evaluating circuit 34. An external voltage UE may be applied here by means of the evaluating circuit via an optional series resistor RV between the first woven fabric layer 21 and the second woven fabric layer 22. The series resistor RV may in this case be connected in series to the total resistance RG. In this case, it is possible via an evaluating unit 35 of the evaluating circuit 34 to evaluate the voltage that is prevailing at the total resistance RG and/or the current that is flowing through the evaluating circuit 34 or the sensor arrangement 33 since the voltage that is prevailing at the total resistance RG or the current that is flowing through the total resistance RG changes depending upon the force F that is acting upon the woven fabric layers. It is preferred that the external voltage UE is a direct current voltage. As is illustrated schematically in FIG. 6, the evaluating unit 35 in accordance with the example evaluates the voltage that is prevailing at the total resistance RG. The evaluating unit 35 may be connected parallel to a measuring resistor so as to evaluate a current, said measuring resistor in turn being connected in series to the total resistance RG of the sensor arrangement 33. By way of example, the series resistor RV may also be used as a measuring resistor.

In the case of a further exemplary embodiment, the sensor arrangement 33 is embodied as a capacitive sensor arrangement (FIG. 7). The intermediate woven fabric layer 23 in this case forms a dielectric and the first woven fabric layer 21 and the second woven fabric layer 22 are embodied as electrodes and correspond so to speak to the plates of a plate capacitor. The evaluating circuit 34 that is connected to the sensor arrangement 33 corresponds to the embodiment according to FIG. 6 with the result that reference may be made to the above explanation. The sensor arrangement 33 deforms depending upon the force F that is acting upon the woven fabric layers with the result that the spacing between the first woven fabric layer 21 and the second woven fabric layer 22 changes at the site at which the force F occurs. In this case, the capacitance C of the sensor arrangement 33 changes, which may be ascertained by means of the evaluating circuit 34 or the evaluating unit 35. In this case, the evaluating unit 35 may measure the voltage that prevails between the first woven fabric layer 21 and the second woven fabric layer 22. A direct current voltage is preferably applied as an external voltage UE.

In the case of the exemplary embodiment of the sensor arrangement 33 that is illustrated in FIG. 8, the intermediate woven fabric layer 23 comprises weft threads 24 or warp threads 25 that include piezoelectric material and therefore may generate a piezovoltage Up. The piezovoltage Up and moreover the first transition resistance R1 and the second transition resistance R2 changes depending upon the force F that is acting upon the woven fabric layers. The voltage that prevails between the first woven fabric layer 21 and the second woven fabric layer 22 may be ascertained and evaluated by means of the evaluating circuit 34. It is not necessary in this case to apply an external voltage and the evaluating circuit 34 may only comprise the evaluating unit 35 that is connected to the first woven fabric layer 21 and the second woven fabric layer 22.

Consequently, the sensor arrangement 33 in the case of exemplary embodiments in which a current may flow from the first woven fabric layer 21, through the intermediate woven fabric layer 23 to the second woven fabric layer 22—or in the opposite direction—may comprise a series circuit of multiple and in accordance with the example three changing electrical characteristics that change in a localized manner depending upon the force F that is acting upon the relevant site.

Figure 9:
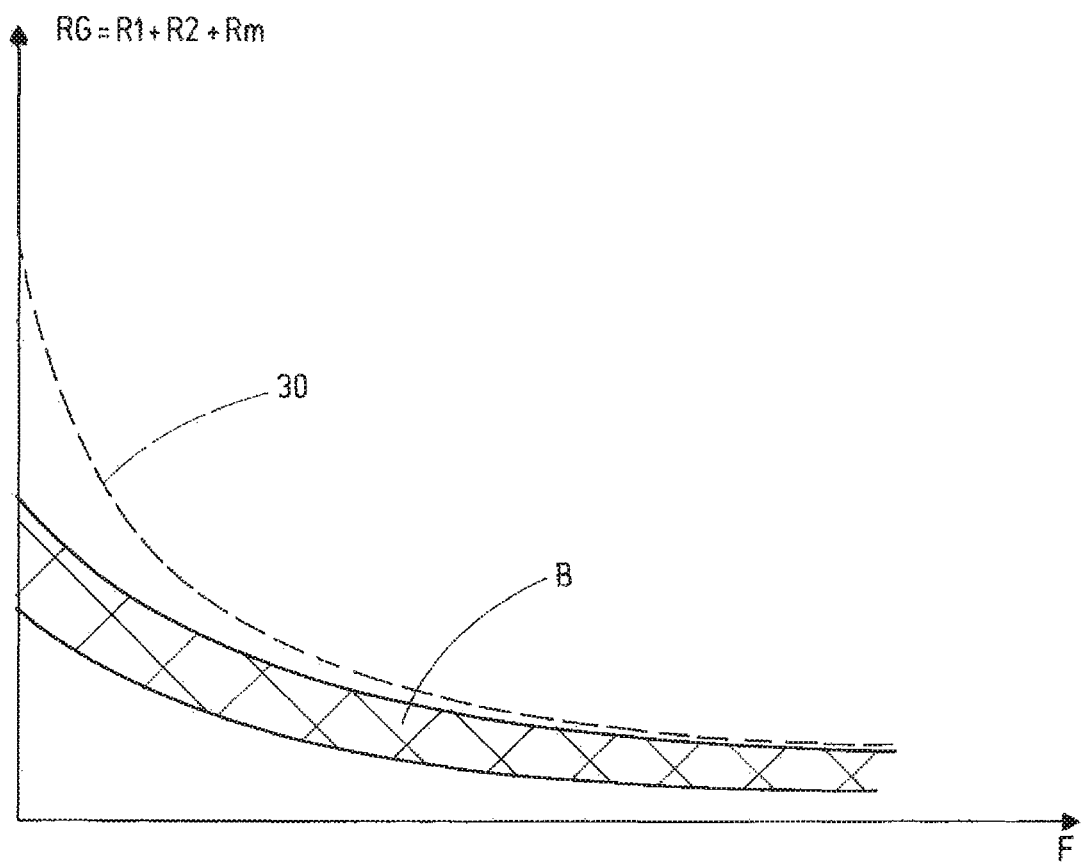
FIG. 9 illustrates a schematic diagram of a qualitative curve of an ohmic total resistance in dependence upon the force F that is acting upon the woven fabric in the case of a resistive sensor arrangement of FIG. 6, FIGS. 10 to 13 respectively illustrate a schematic diagram of different woven binding arrangements by means of a binding system of the woven fabric.

The procedure of connecting the woven fabric layers 21, 22, 23 using a weaving technique with or without a binding system 26 has the advantage that the spread of the sensor arrangement 33 may be more closely limited. The total resistance RG in dependence upon the force F that is acting upon the woven fabric layers is illustrated in FIG. 9 in an exemplary manner with reference to the exemplary embodiment of the sensor arrangement 33 in accordance with FIG. 6. The woven fabric layers 21, 22, 23 are not sewn to one another or adhered to one another or the like. It has been found that the tolerance range B of the total resistance RG that is dependent upon the force F, said tolerance range occurring owing to production tolerances, may be limited with respect to other multi-layer sensory woven fabrics by means of only connecting the woven fabric layers 21, 22, 23 using a weaving technique. The tolerance range B that occurs on account of the connection of the woven fabric layers using a weaving technique is illustrated schematically in FIG. 9 by a crosshatched pattern. In contrast, the tolerance range B increases if the woven fabric layers 21, 22, 23 are connected to one another after their production procedure by way of example by means of sewing or other mechanical means, which is illustrated schematically by means of the dashed upper limit BO in FIG. 9 that is displaced with respect to the upper limit of the tolerance range B of the woven fabric 20 in accordance with this disclosure. In the case of the exemplary embodiments that are described in this case, only a woven binding arrangement is therefore produced between the woven fabric layers 21, 22, 23 without an additional mechanical, physical or chemical connection between the woven fabric layers 21, 22, 23 being produced.

It is apparent in the FIGS. 2 to 5 that the first woven fabric layer 21 in accordance with the example comprises electrically conductive strips 40 and electrically non-conductive strips 41 in an alternating manner in the weft direction S. By way of example, in an electrically conductive strip 40 at least some or all of the weft threads 24 are electrically conductive while only electrically non-conductive weft threads 24 are arranged in the electrically non-conductive strips 41. The warp threads 25 of the first woven fabric layer 21 may be electrically non-conductive in the case of one exemplary embodiment in particular if the electrically conductive warp threads 24 that are provided in a conductive strip 40 are in electrical contact with one another. Alternatively, it is also possible that at least some or all of the warp threads 25 of the first woven fabric layer 21 are electrically conductive and respectively form a transverse contacting arrangement 39 in one or all of the electrically conductive strips 40. If electrically conductive warp threads 25 are used as transverse contacting arrangements 39 it is necessary to prevent the electrically conductive strips 40 electrically short-circuiting by means of these warp threads 25. For this purpose, the electrically conductive warp threads are unwoven in the region of the electrically non-conductive strip 41 with the result that an electrical connection is interrupted. For this purpose, by way of example it is advantageous that an electrically conductive warp thread 25 within a non-conductive strip 41 forms a floating stitch that is preferably severed at two sites that are spaced apart from one another. The severed part of the warp thread 25 may be removed. The separation of an electrically conductive warp thread 25 that respectively forms a transverse contacting arrangement 39 in the electrically conductive strips 40 is illustrated in a greatly schematic manner in FIG. 4.

The second woven fabric layer 22 forms extending in the warp direction K electrically conductive strips 40 and electrically non-conductive strips 41 that are arranged adjacent to one another in an alternating manner in the weft direction S. In an electrically conductive strip 40 some or all of the warp threads 25 may be electrically conductive and only electrically non-conductive warp threads 25 are used in a non-conductive strip 41. If one of the or multiple weft threads 24 in the second woven fabric layer 22 for forming a transverse contacting arrangement 39 are electrically conductive (similar to the description of the first woven fabric layer 21), an electrical connection between the electrically conductive strip 40 may be prevented by means of the relevant electrically conductive weft thread 24 by virtue of the fact that this weft thread is severed in the region of the electrically non-conductive strip 41. It is preferred that the relevant electrically conductive weft thread 24 within each non-conductive strip 41 is severed at two sites that are spaced apart from one another and the part of the weft thread 24 that is severed is removed. For this purpose, the relevant weft thread 24 at least in one range of the respective electrically non-conductive strip 41 may comprise a floating stitch that is severed.

The transverse contacting arrangement 39 in an electrically conductive strip 40 may be produced in one or the two woven fabric layers 21, 22 alternatively or in addition also by means of sewing and/or stitching using an electrically conductive yarn and/or applying an electrically conductive layer, by way of example by means of bonding and/or pressing and/or spraying etc.

The direction of extent of the strips 40, 41 in the first woven fabric layer 21 is oriented at a right angle with respect to the direction of extent of the strips 40, 41 in the second woven fabric layer 22. In a deviation from the illustrated exemplary embodiment, the strips 40, 41 in the first woven fabric layer 21 could also extend in the warp direction and the strips 40, 41 in the second woven fabric layer 22 could also extend in the weft direction S.

A so to speak grid structure or matrix structure occurs by means of the described arrangement of the electrically conductive strips 40 and the electrically non-conductive strips 41 in the first woven fabric layer 21 and the second woven fabric layer 22. When a force F acts upon the woven fabric 20 or the sensor arrangement 33, it is consequently possible to determine at which site the force F acts upon the woven fabric surface of the woven fabric 20. In this case, the spatial resolution depends on the number and the width of the strips 40, 41. It is advantageous if the electrically non-conductive strips 41 comprise as small a width as possible in a transverse manner with respect to their direction of extent with the result that the electrical insulating arrangement is ensured between the respective adjacent electrically conductive strips 40 but as large a proportion as possible of the surface may be used as an active sensor surface.

Figure 4:
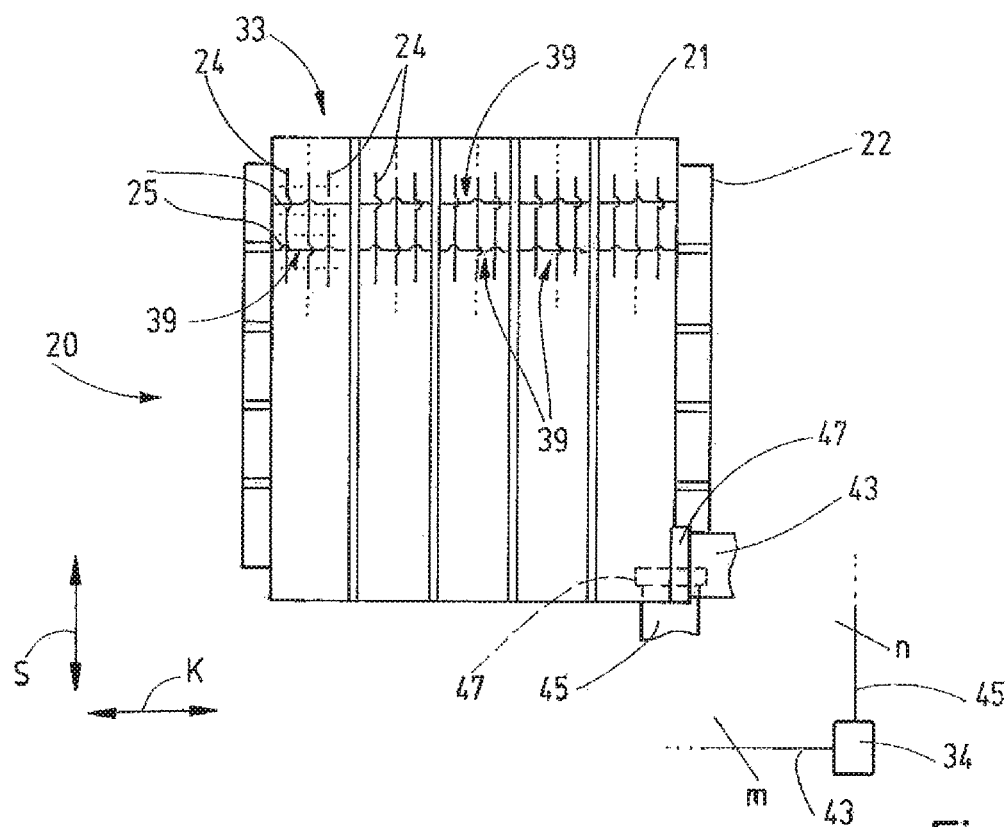
FIG. 4 illustrates in a block diagram-like manner the woven fabric of FIG. 3 if an electrical contacting arrangement has been produced.

In the case of the exemplary embodiment in accordance with FIGS. 3 and 4, the electrically conductive strips 40 of the first woven fabric layer 21 are electrically connected on a single side by way of example on a first side 42 to a first line 43. The first line 43 comprises a corresponding number of conductors or wires depending upon the number of the conductive strips 40. In the case of the exemplary embodiment, the first line 43 has m wires or conductors (m= 2, 3, 4 . . . ).

Accordingly, the conductive strips 40 of the second woven fabric layer 22 are electrically connected to a second line 45 on one single side and in accordance with the example on a second side 44. The second line 45 has multiple conductors or wires corresponding to the number of the electrically conductive strips 40 and in the exemplary embodiment in accordance with the example n conductors or wires (n=2, 3, 4, . . . ). The number m and the number n may be identical or may differ from one another.

The lines 43, 45 may be electrically connected to the electrically conductive strips 40 respectively via a plug 47 or another connecting means directly in a connecting region, by way of example on the woven fabric edge of the relevant woven fabric layer 21, 22. A connecting means may therefore be provided on this connecting region so as to mount a plug 47. For this purpose, electrically conductive connecting conductors 48 that extend in a transverse manner with respect to the electrically conductive strips 40 in the woven fabric structure of the relevant woven fabric layer 21, 22 may be provided or alternatively may be applied to the woven fabric layer 21, 22. The connecting conductors 48 by way of example may be electrically conductive weft threads 24 (for example in the first woven fabric layer 21) or electrically conductive warp threads 25 (for example in the second woven fabric layer 22). Each connecting conductor 48 is only electrically connected respectively to one of the electrically conductive strips 40 and a contacting arrangement in the connecting region and is electrically insulated with respect to the other electrically conductive strips 40. The installation space that is required for the connecting region so as to connect the plug 47 or the lines 43, 45 on the woven fabric edge may be particularly small here and the outlay for producing the electrical connection is small. When a sensory woven fabric 20 is being laid on site, it is only necessary to lay and connect the external first or second line 43, 45. All the other electrical contacting arrangements may already be produced earlier during the production procedure.

As is illustrated in FIG. 4, the first side 42 and the second side 44 are arranged adjacent to one another, wherein one of the two sides and in accordance with the example the first side 42 extends in the warp direction K and the respective other of the two sides and in accordance with the example the second side 44 extends in the weft direction S. As a consequence, a simple electrical contacting arrangement is also possible in the case of comparatively large surfaces on two adjacent sides 42, 44.

The evaluating circuit 34 is connected to the lines 43, 45. In the evaluating circuit 34, it is not only possible to identify that a force F is acting upon the woven fabric 20 or the sensor arrangement 33 but rather it is also possible to determine at which crossing site between an electrically conductive strip 40 of the first woven fabric layer 21 and an electrically conductive strip 40 of the second woven fabric layer 22 the force F acts since all the electrically conductive strips 40 are connected via separate conductors to the evaluating circuit 34.

Figure 5:
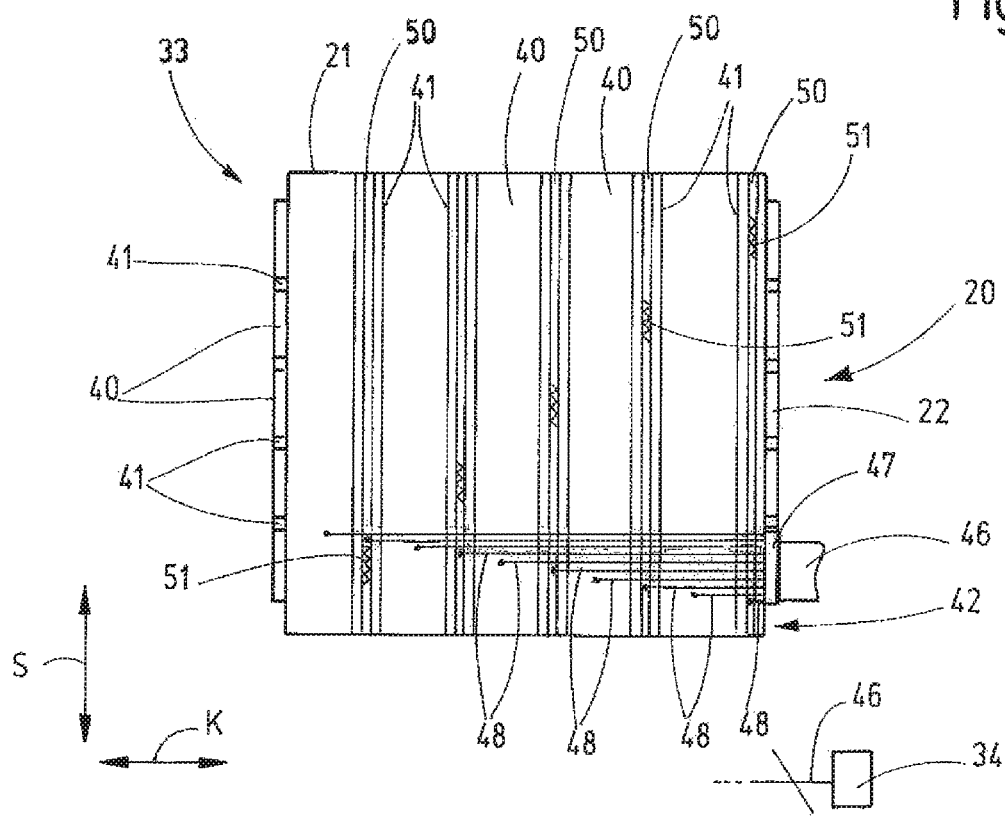
FIG. 5 illustrates in a block diagram-like manner an alternative embodiment of the woven fabric, FIGS. 6 to 8 respectively illustrate schematically an exemplary embodiment of a sensor arrangement that is formed by means of the woven fabric.

A further embodiment for simplifying the electrical contacting arrangement between the sensor arrangement 33 and the evaluating circuit 34 is illustrated in FIG. 5. There, both the electrically conductive strips 40 of the first woven fabric layers 21, as well as the electrically conductive strips 40, of the second woven fabric layer 22 are electrically connected to a common line 46 on a common side and in accordance with the example on the first side 42 of the woven fabric 20. The common line 46 comprises a number of wires or conductors, said number corresponding to at least the sum of the number of electrically conductive strips 40 of the first woven fabric layers 21 and the number of electrically conductive strips 40 of the second woven fabric layer 22. The electrical contacting arrangement of the woven fabric 22 is consequently achieved only on one single woven fabric edge and is consequently further simplified, in particular in the case of large-scale woven fabrics 20 that are used by way of example as a floor covering.

In order to render the contacting arrangement possible on a single side via a common line 46, an electrically conductive intermediate strip 50 is woven either in the first woven fabric layer 21 or the second woven fabric layer 22 in each electrically non-conductive strip 41 respectively. The electrically conductive intermediate strip 50 is electrically insulated with respect to the two adjacent electrically conductive strips 40 of the woven fabric layer 21 or 22, by way of example are arranged spaced apart. Each electrically conductive intermediate strip 50 is connected by means of a through-contacting arrangement 51 to precisely one electrically conductive strip 40 of the respective other woven fabric layers 22 or 21. The through-contacting arrangement 51 may be achieved by virtue of the fact that at least one electrically conductive thread connects the intermediate strip 50 to the respectively allocated electrically conductive strip 40 of the respective other woven fabric layer 22 or 21. In the case of the exemplary embodiment that is illustrated in FIG. 5, the electrically conductive intermediate strips 50 are provided in the first woven fabric layer 21 and produce by means of the through-contacting arrangements 51 connections to the electrically conductive strips 40 of the second woven fabric layer 22. Consequently, the electrical contacting arrangement of each electrically conductive strip 40 of the second woven fabric layer 22 may be provided via the through-contacting arrangement 51 and the electrically conductive intermediate strip 50 on the first woven fabric layer 21 and therefore on a common side of the woven fabric 20. Apart from that, the connection to the common line 46 is provided via connecting conductors 48 from the electrically conductive strips 40 and intermediate strips 50, as was described in connection with FIGS. 3 and 4.

The at least one thread of the through-contacting arrangement 51 may be an electrically conductive warp thread and/or electrically conductive weft thread of at least one of the strips 40, 50 that are to be connected and for example the electrically conductive intermediate strip 50 that is connected to the respectively allocated electrically conductive strip 40 using a weaving technique during the procedure of producing the woven fabric 20 or vice versa.

In an alternative to the illustrated exemplary embodiment, the through-contacting arrangements 51 may also be produced by means of other electrical connections subsequent to producing the woven fabric 20, by way of example by means of sewing a conductive bar, by means of introducing a rivet that is embodied from electrically conductive material, etc. However, it is preferable if the through-contacting arrangement 51 is already produced when weaving the woven fabric 20 on a weaving machine.

A through-contacting arrangement 51 penetrates the intermediate layer 23. An electrical connection to the intermediate layer 23 may be produced in this case depending upon the embodiment of the sensor arrangement 33 if said intermediate layer comprises electrically conductive components in the region of the through-contacting arrangement 51, by way of example in the case of the embodiment according to FIG. 6. In the unloaded state of the sensor arrangement 33, the electrical resistance Rm of the intermediate layer 23 is sufficiently great that the electrical connection of the through-contacting arrangement 51 to the intermediate layer 23 does not impair the function. It is also possible to prevent the electrical connection between the through-contacting arrangement 51 and the intermediate layer 23 by means of insulating measures.

Figure 14:
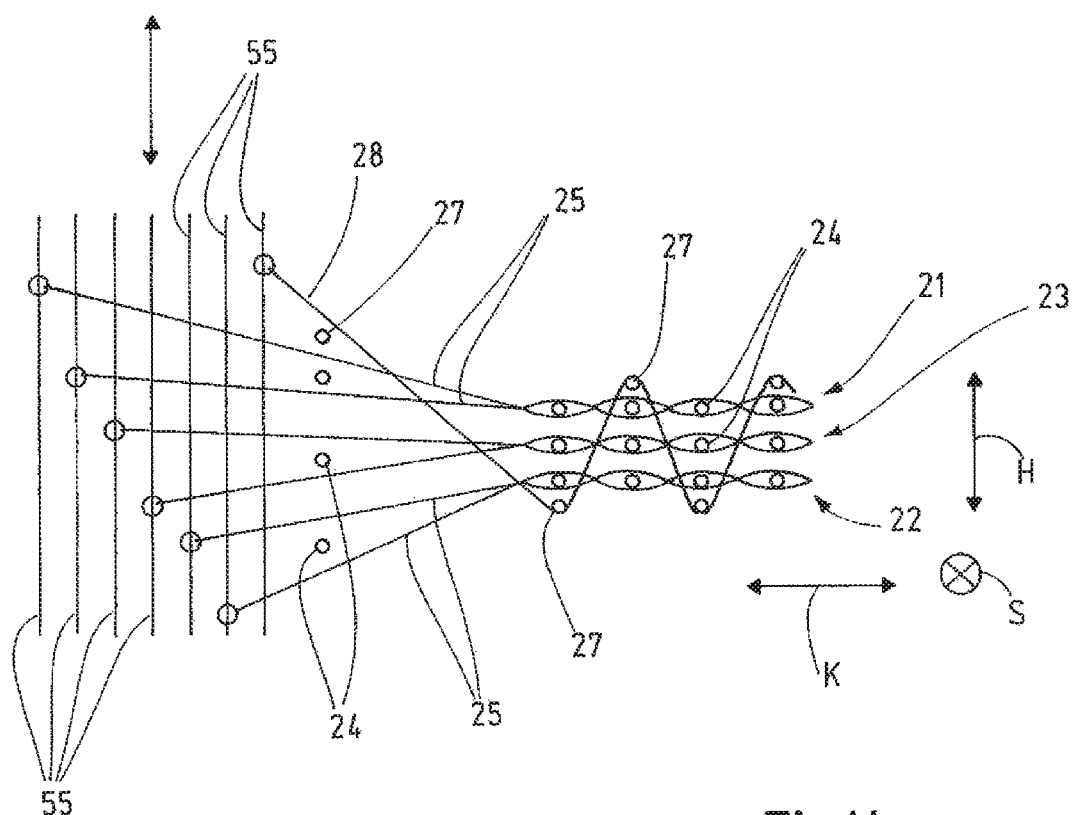
FIG. 14 illustrates an exemplary schematic diagram of the weaving procedure for weaving the woven fabric on a weaving machine.

FIG. 14 illustrates a weaving procedure in a greatly schematic manner similar to a block diagram as said weaving procedure may be performed on a weaving machine so as to produce the woven fabric 20. The weaving machine comprises at least and by way of example precisely seven heald wires 55. The heald wires 55 may move in the height direction H independently of one another upwards and downwards and respectively guide the warp threads 25 of one of the woven fabric layers 21, 22, 23 or the binding warp threads 28. It is possible to introduce and beat into place the weft threads 24 or the binding weft threads 27 by means of creating an appropriate shed. The manner in which the shed is formed and the number of the weft threads 24 or binding weft threads 27 that are threaded depend on the desired type of binding arrangement and may vary. FIG. 14 illustrates one of many possibilities in a purely exemplary manner.

Possibilities for producing the woven fabric 20 using a weaving machine are disclosed by way of example in the publication of Pelin Gurkan Unal with the title "3D-Woven Fabrics" (published in "Woven Fabrics", edited by Han-Yong Jeon, ISBN 978-953-51-0607-4 which may be found using the link http://www.intechopen.com/books/woven-fabrics.

The invention relates to a multi-layer sensory woven fabric 20 having multiple and in accordance with the example three woven fabric layers 21, 22, 23. Each woven fabric layer 21, 22, 23 comprises weft threads 24 and warp threads 25. Optionally a binding system 26 having binding weft threads 27 and binding warp threads 28 may be provided. The first woven fabric layer 21 and the second woven fabric layer 22 comprise electrically conductive strips 40 and electrically non-conductive strips 41 that respectively extend in a warp direction K or in a weft direction S, said strips being arranged adjacent to one another in an alternating manner, wherein the strips 40, 41 of the two woven fabric layers 21, 22 cross one another.

What is claimed is:

1. A woven fabric comprising:
   a plurality of layers that are arranged one above the other, wherein:
   the plurality of layers includes a first woven fabric layer, a second woven fabric layer, and an intermediate layer that is arranged between the first and second woven fabric layers,
   the first woven fabric layer comprises a plurality of electrically conductive warp threads and/or weft threads,
   the second woven fabric layer comprises a plurality of electrically conductive warp threads and/or weft threads,
   the first woven fabric layer, the second woven fabric layer, and the intermediate layer form a sensor arrangement that comprises an electrical characteristic that changes while a force is acting upon the plurality of layers,
   the first woven fabric layer comprises a plurality of electrically conductive strips and a plurality of electrically non-conductive strips that extend in a warp direction or in a weft direction,
   the plurality of electrically conductive strips and the plurality of electrically non-conductive strips of the first woven fabric layer are arranged adjacent to one another in an alternating manner,
   the second woven fabric layer comprises a plurality of electrically conductive strips and a plurality of electrically non-conductive strips that extend in a transverse manner with respect to the strips of the first woven fabric layer,
   the plurality of electrically conductive strips and the plurality of electrically non-conductive strips of the second woven fabric layer are arranged adjacent to one another in an alternating manner,
   at least a portion of the threads in each of the plurality of electrically conductive strips of the first woven fabric layer are electrically conductive weft threads,
   at least a portion of the threads in each of the plurality of electrically conductive strips of the second woven fabric layer are electrically conductive weft threads,
   the non-conductive strips of the first and second woven fabric layers comprise weft threads,
   all of the weft threads in the plurality of electrically non-conductive strips of the first woven fabric layer are non-conductive weft threads, and
   all of the weft threads in the plurality of electrically non-conductive strips of the second woven fabric layer are non-conductive weft threads.

2. The woven fabric of claim 1, wherein the intermediate layer is a woven fabric layer.

3. The woven fabric of claim 1, wherein at most three layers of the plurality of layers are woven fabric layers.

4. The woven fabric of claim 1, wherein the first woven fabric layer is electrically connected on a single side of the woven fabric via woven electrical connecting conductors to evaluating circuit.

5. The woven fabric of claim 4, wherein the second woven fabric layer is electrically connected on a single side of the woven fabric via woven electrical connecting conductors to the evaluating circuit.

6. The woven fabric of claim 5, wherein:
the first woven fabric layer is electrically connected on a first side of the woven fabric to the evaluating circuit,
the second woven fabric layer is electrically connected on a second side of the woven fabric to the evaluating circuit, and
the first side and the second side adjoin one another.

7. The woven fabric of claim 5, wherein the first woven fabric layer and the second woven fabric layer are electrically connected on a common side of the woven fabric to the evaluating circuit.

8. The woven fabric of claim 1, wherein:
an electrically conductive intermediate strip is woven respectively in the first woven fabric layer or the second woven fabric layer in at least one electrically non-conductive strip, and
the intermediate strip is electrically insulated with respect to the two adjacent electrically conductive strips in this woven fabric layer.

9. The woven fabric of claim 8, wherein each electrically conductive intermediate strip in the first woven fabric layer or the second woven fabric layer is connected by a through-contacting arrangement to precisely one electrically conductive strip of the respective other woven fabric layer.

10. The woven fabric of claim 9, wherein the through-contacting arrangement is produced by a woven connection of at least one conductive thread from the intermediate strip of the woven fabric layer to at least one conductive thread from the electrically conductive strip of the respective other woven fabric layer.

11. The woven fabric of claim 1, wherein the plurality of electrically conductive threads that extend in an electrically conductive strip in the direction of the strip are electrically connected to one another by at least one transverse contacting arrangement.

12. The woven fabric of claim 1, wherein a warp thread and/or a weft thread of the first woven fabric layer from an electrically non-conductive strip forms a woven binding arrangement with a weft thread or warp thread of another woven fabric layer.

13. The woven fabric of claim 1, wherein a warp thread and/or a weft thread of the second woven fabric layer from an electrically non-conductive strip forms a woven binding arrangement with a weft thread or warp thread of another woven fabric layer.

14. The woven fabric of claim 1, wherein:
a binding system having electrically non-conductive binding warp threads and electrically non-conductive binding weft threads is formed, and
the binding system is configured by forming woven binding arrangements so as to connect the woven fabric layers.

15. The woven fabric of claim 14, wherein the first woven fabric layer, the second woven fabric layer, and the intermediate layer are not directly connected to one another using a weaving technique.

16. The woven fabric of claim 1, wherein:
the first woven fabric layer and the second woven fabric layer are produced on a common weaving machine, and
the three layers in this case moreover using a weaving technique are connected indirectly by an additional binding system and/or are directly connected to one another.

17. The woven fabric of claim 16, wherein:
the intermediate layer is a woven fabric layer,
the first woven fabric layer, the second woven fabric layer, and the intermediate layer are produced on a common weaving machine, and
the three layers in this case moreover using a weaving technique are connected indirectly by an additional binding system and/or are directly connected to one another.

18. The woven fabric of claim 1, wherein:
one of the plurality of layers forms a lowest woven fabric layer (LU), and
another of the plurality of layers forms an uppermost woven fabric layer (LO).

19. The woven fabric of claim 18, wherein the uppermost woven fabric layer (LO) is formed by the first woven fabric layer.

20. The woven fabric of claim 18, wherein the lowest woven fabric layer (LU) is formed by the second woven fabric layer.

* * * * *